April 25, 1961　　　　G. R. O'NEIL　　　　2,981,213
FLEXIBLE PLANTER UNIT
Filed June 13, 1958　　　　　　　　　　　3 Sheets-Sheet 1

Inventor:
Gordon R. O'Neil
Paul O. Pippel
Atty.

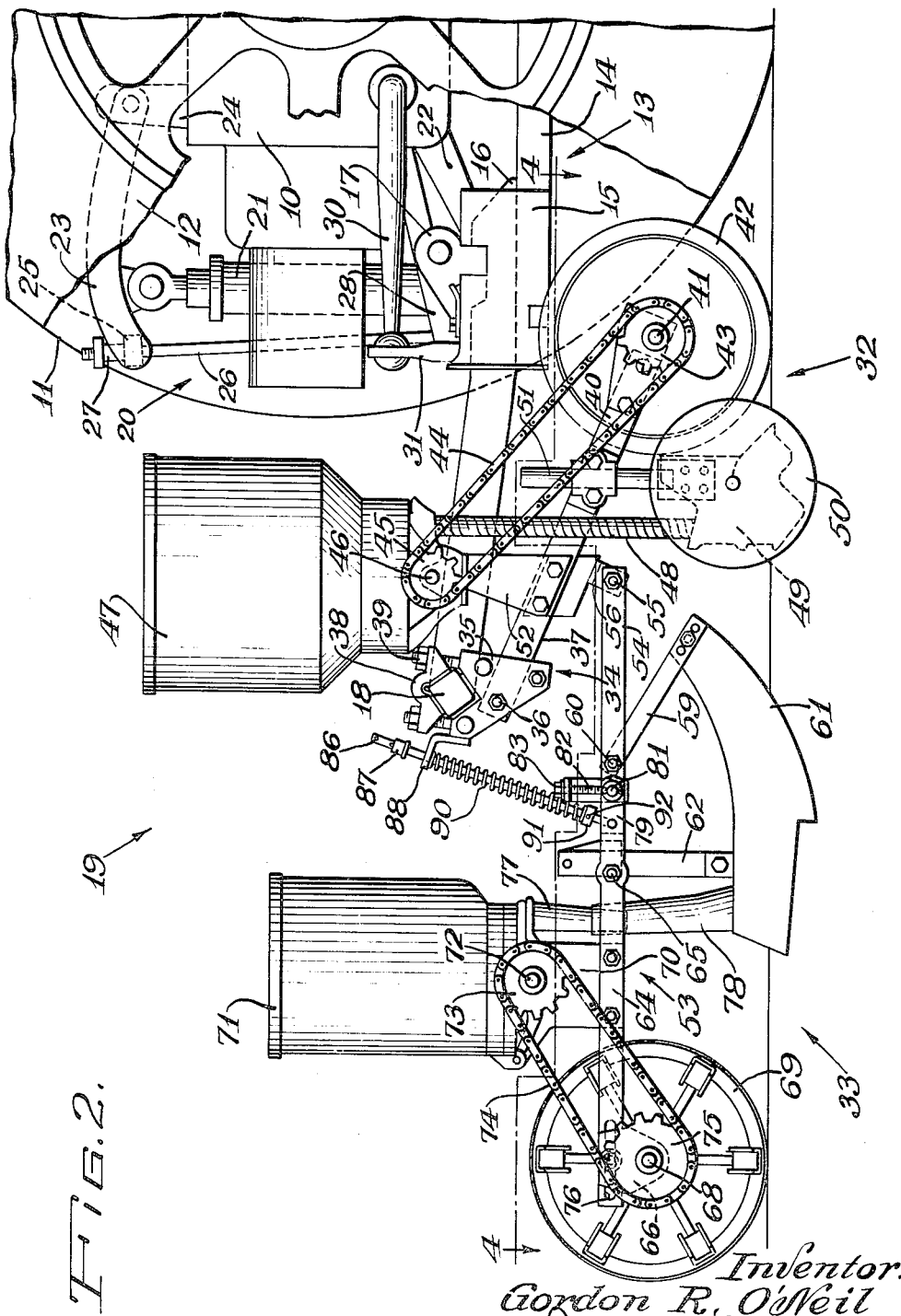

April 25, 1961  G. R. O'NEIL  2,981,213
FLEXIBLE PLANTER UNIT
Filed June 13, 1958  3 Sheets-Sheet 3
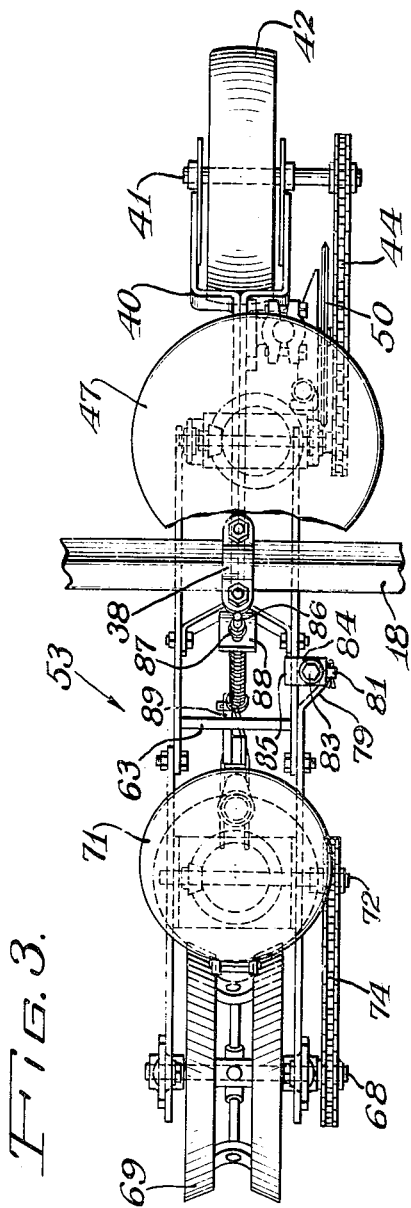
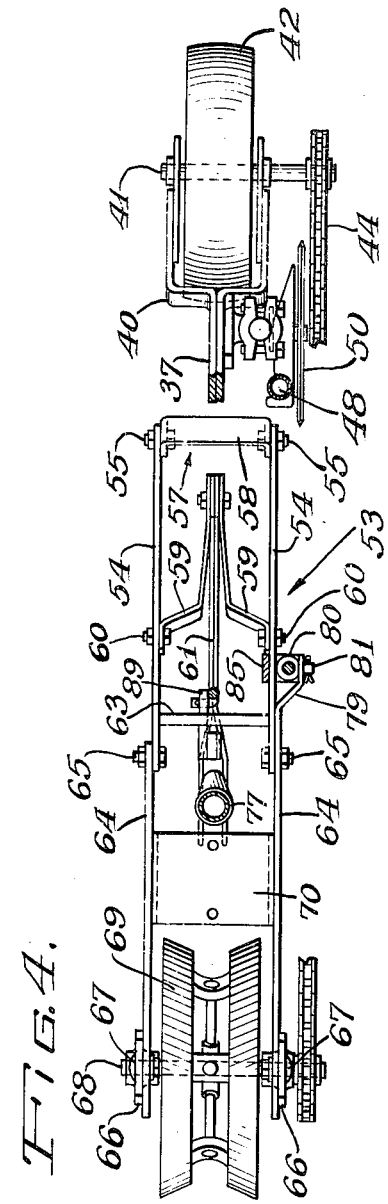
Inventor:
Gordon R. O'Neil
Paul O. Pippel
Atty.

United States Patent Office 2,981,213
Patented Apr. 25, 1961

2,981,213

FLEXIBLE PLANTER UNIT

Gordon R. O'Neil, Canton, Ill., assignor to International Harvester Company, Chicago, Ill., a corporation of New Jersey Filed June 13, 1958, Ser. No. 741,771

3 Claims. (Cl. 111—64)

This invention relates to agricultural implements and particularly to planters. More specifically, the invention concerns a tool bar type of planter having both seed and fertilizer dispensing sections, wherein a plurality of separate planter units are mounted at spaced locations on the support for planting a plurality of rows.

An object of the invention is the provision of an improved planter of the type referred to wherein each unit is capable of closely following the contour of the ground and to plant at substantially uniform depth.

Another object of the invention is the provision of an improved gauge wheel controlled planter wherin the position of the gauge wheel fluctuates with the changes in contour of the ground while the planting units gauged by the wheel fluctuate to a lesser extent to allow them to compensate gradually for sharp changes in ground contour encountered by the gauge wheel.

Another object of the invention is the provision of an improved gauge wheel controlled tool bar planter wherein the planter consists of a gauge wheel section mounted ahead of the tool bar on a swinging arm pivotally connected to the tool bar and the main planter section extends rearwardly of the tool bar and is pivotally connected at its forward end to the gauge wheel arm at a location between the wheel and the pivot of the arm on the tool bar so that the front end of the planter section moves vertically a lesser distance than the gauge wheel.

Other objects and advantages of the invention will become clear from the following detailed description when read in conjunction with the accompanying drawings, wherein:

Figure 2 is an enlarged view in side elevation of the rear end of a tractor, with part of one wheel broken away, and showing one of the planter units making up the four-row planter shown in Figure 1;

Figure 3 is a plan view of the planting unit shown in Figure 2 and on a smaller scale in Figure 1; and Figure 4 is a section taken on the line 4—4 of Figure 2.

Figure 1:
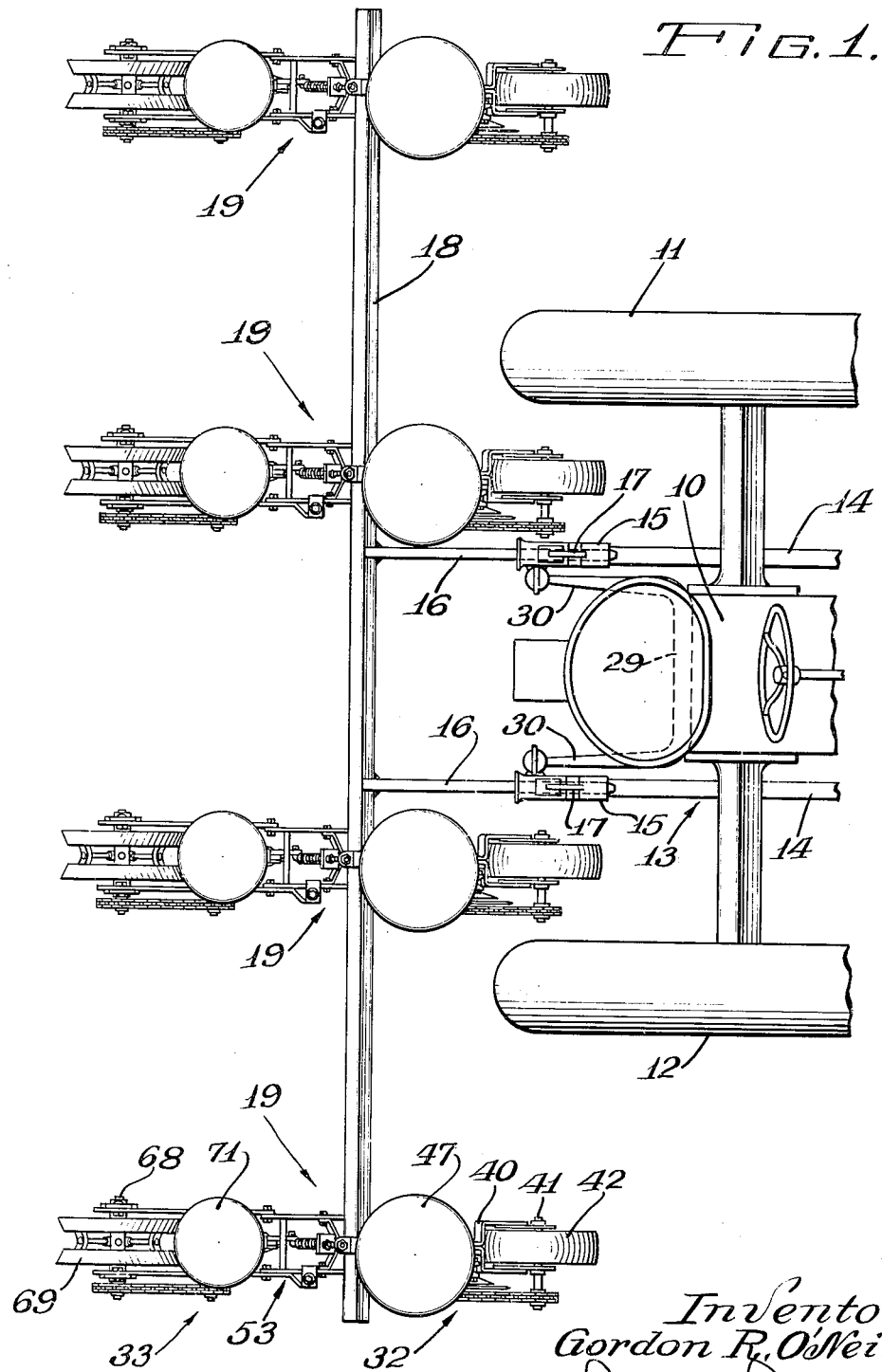
Figure 1 is a plan view of a tractor mounted tool bar planter comprising a plurality of individual planter units incorporating the features of this invention.

In a tool bar planter of the type shown flexibilty of the individual units is of prime importance since contour variations occur throughout the width of the path covered by the planter.

In the drawings, the numeral 10 designates the body of a tractor having laterally spaced rear drive wheels 11 and 12 and a hitch structure 13, the latter suitably connected to the tractor body ahead of the drive wheels in a manner, not shown, permitting vertical swinging of the hitch. The details of construction of the hitch 13 form no part of this invention. However, it may be understood that the hitch includes laterally spaced rearwardly extending arm portions 14, to the rear end of each of which is affixed an elongated socket member 15. Socket members 15 serve for the sliding reception and integral association of a pair of laterally spaced longitudinally extending shafts 16, the forward ends of which are suitably locked in the respective sockets 15 by latch means indicated at 17, and the rear ends of which are affixed, as by welding, to a transversely extending tool bar 18, square in cross-section, upon which are mounted a plurality of laterally spaced planting units 19.

The tractor is provided with lifting apparatus 20 for raising and lowering the hitch 13 and the implement connetced thereto, and it may be understood, briefly, that the lifting apparatus comprises a hydraulic ram 21 connected to a support 22 affixed to the tractor body and to an arm 23 pivoted at one end to a lug 24 mounted on the tractor body. The other end of arm 23 carries a swivel 25 which slidably receives a rod 26 threaded at its upper end to receive a stop 27 engageable with the swivel, and connected at its lower end to a rock arm 28 affixed to a transverse shaft 29 rockably mounted on the tractor body and having its ends bent to form rearwardly extending lift arms 30, the ends of which are pivotally connected to lifting links 31, the lower ends of which are connected to the respective sockets 15. Thus, operation of ram 21 acts through rod 26 and lift arms 30 to raise and lower the hitch 13 and the implement connected thereto.

The planter units 19 are duplicates and a description of one will suffice for all. Each unit comprises a gauge wheel or fertilizer section 32 and rearwardly thereof a seed dispensing section 33. Each of the units is mounted on the tool bar 18 through the intermediary of a bracket 34 comprising a pair of laterally spaced plates 35 carrying a pivot pin 36 upon which is mounted for vertical swinging the rear end of a forwardly and downwardly extending arm 37. Bracket 34 is secured to the tool bar 18 by a clamp 38 and bolts 39.

To the forward end of arm 37 is affixed a yoke 40 rotatably carrying a shaft 41 upon which is mounted, between the arms of the yoke, a ground-engaging gauge wheel 42. To one end of shaft 41 is affixed a sprocket wheel 43 drivingly connected by a chain 44 with another sprocket wheel 45 mounted on the operating shaft 46 for a fertilizer hopper 47. Fertilizer from hopper 47 passes through a flexible tube 48 to a boot 49 to which is secured a furrow opening disk 50 adapted to form a furrow for the reception of the fertilizer. Boot 49 is secured to the lower end of a standard 51 secured to arm 37. Hopper 47 is supported by a plate 52 secured to arm 37.

The seed dispensing section 33 of the planter unit has a frame 53 comprising a pair of forward laterally spaced frame bars 54, the forward ends of which are pivotally connected by bolts 55 to the arms 56 of a U-shaped member 57 having a transverse portion 58 affixed to arm 37 medially of its ends.

A pair of straps 59 connected by bolts 60 to bars 54 converge forwardly and downwardly and are secured to the forward end of a runner type of furrow opener 61 to the rear portion of which is secured an upright bar 62, the upper end of which is affixed to a brace 63 extending between bars 54.

At this point it should be clear that the forward fertilizer section 32 including gauge wheel 42 and disk 50 is vertically swingable by virtue of the pivotal connection of arm 37 to pin 36. This allows the gauge wheel 42 to rise and fall with changes in the contour of the ground over which the planter is travelling. Since the pivot point 55 of the forward end of bars 54 is about half-way between the pivot 36 and shaft 41, so that gauge wheel 42 swings vertically on a long radius and in an arcuate path much longer than the path of movement of pivot point 55, the distance of which from the axis of pivot 36 is considerably less than that of wheel 42, whereby the pivot point 55 and the furrow opener 61 rise and fall more slowly than the wheel 42. This allows the planter furrow opener 61 to compensate for travel over rough ground gradually, should the gauge wheel encounter sharp variations in ground contour.

Planter frame 53 also includes a pair of laterally spaced frame bars 64, having their forward ends pivotally connected to the rear ends of bars 54 by bolts 65 and having hangers 66 secured to their rear ends by bolts 67.

Hangers 66 rotatably support a transverse shaft 68 on which is mounted, between the bars 64, a press wheel 69. A plate 70 mounted between bars 64 serves as a support for a seed hopper 71, which it may be understood is provided with conventional seed dispensing apparatus driven by a shaft 72 having a sprocket wheel 73 mounted on one end and drivingly connected by a chain 74 with another sprocket wheel 75 mounted on shaft 68.

Press wheel 69 also serves to gauge the depth of operation of runner 61, and drive chain 74 is adjusted by loosening bolts 67 and sliding them longitudinally in slots 76 provided in the rear ends of bars 64. Seed discharged from hopper 71 passes through a funnel 77 carried thereby into a tube 78 secured to the bifurcated rear end of runner 61, and in which funnel 77 is telescopically received.

Press wheel 69 is held against upward movement relative to runner 61 but allowed to move downwardly with respect thereto to maintain driving engagement with the ground when the wheel falls into a depression. This is accomplished by the provision of an extension 79 on right-hand bar 64 of frame 53. Extension 79 is bent outwardly and forwardly and confines between its end and the right-hand bar 54 a swivel 80 mounted in the extension by a pin 81 and adapted to adjustably receive a bolt 82 having a head 83 engageable with the transverse portion 84 of a bracket 85 affixed to the associated bar 54 of the frame, the transverse portion 84 of the bracket having an opening therein adapted to slidably receive the bolt 82. Sliding of the bolt in the opening permits the wheel 69 to lower with respect to the furrow opener 61 and vertical adjustment of the wheel is made by manipulating bolt 83 with respect to the swivel 80 in which it is received.

Upon operating the hydraulic ram 21 to raise the implement to transport position, the entire tool bar 18 with all of the planter units 19 mounted thereon is raised on the tractor to a transport position. In order to yieldably hold the seed dispensing section 33 downwardly to its work, while permitting it to be lifted with the tool bar 18 in a substantially level position, a connection is provided between the tool bar 18 and the seed dispensing section 33 through a lift rod 86 having a stop member 87 adjustably secured to the upper end thereof, and slidably received in an opening provided in an angle bracket 88 affixed to bracket 35. The lower end of rod 86 is connected to a lug 89 secured to brace 63, and a spring 90 surrounding the rod engages the L-shaped bracket 88 at its upper end, and at its lower end a collar 91, collar 91 being provided with a set screw 92 by which the collar may be adjustably secured to the lower end of the rod to regulate the tension on the spring 90.

It is believed that the operation of the flexible planter structure of this invention will be clearly understood from the foregoing description. It should likewise be understood that the invention has been described in its preferred embodiment only, and that modifications may be made therein without departing from the spirit of the invention or the scope of the appended claims.

What is claimed is:

1. In a planter attachment for a tractor having rear drive wheels, power lifting means and a transverse tool bar connected to the tractor and to the lifting means to be raised and lowered thereby, a planter unit mounted on the tool bar comprising a first ground-engaging section ahead of the tool bar and a second ground-engaging section rearwardly thereof, said first section including a gauge wheel, an arm pivotally connected at its rear end to the tool bar and carrying the gauge wheel at its forward end for vertical swinging with the arm in response to changes in ground contour, and said second section including a frame, a furrow opener mounted on the frame, and means pivotally connecting said frame to said arm medially of its ends for vertical swinging relative thereto and to accommodate vertical movement of the forward end of the frame with said arm and at a lower rate of speed than said gauge wheel.

2. The invention set forth in claim 1, wherein said first section also includes a furrow opener and a hopper mounted on said arm for dispensing material to the furrow formed by said last-mentioned furrow opener, and a press wheel mounted on the rear end of said frame.

3. The invention set forth in claim 2, wherein the mounting of said press wheel on said frame includes lost motion means accommodating limited downward swinging of the press wheel relative to the frame.

References Cited in the file of this patent

UNITED STATES PATENTS

| | | |
|---|---|---|
| 1,434,575 | Waterman | Nov. 7, 1922 |
| 2,054,513 | Kriegbaum et al. | Sept. 15, 1936 |
| 2,064,480 | Lock et al. | Dec. 15, 1936 |
| 2,328,174 | Silver | Aug. 31, 1943 |
| 2,694,356 | Haas | Nov. 16, 1954 |
| 2,833,197 | Oehler et al. | May 6, 1958 |

FOREIGN PATENTS

| | | |
|---|---|---|
| 193,645 | Austria | Nov. 25, 1957 |
| 1,008,511 | Germany | May 16, 1957 |